United States Patent
Fulk et al.

[11] 3,847,579
[45] Nov. 12, 1974

[54] METHOD OF AND APPARATUS FOR PROCESSING LINEAR ELEMENTS

[75] Inventors: Walter F. Fulk, Newark; Phra D. Lyle, Granville, both of Ohio

[73] Assignee: Owens-Corning Fiberglass Corporation, Toledo, Ohio

[22] Filed: Mar. 22, 1973

[21] Appl. No.: 343,768

[52] U.S. Cl.................. 65/11 W, 65/2, 242/18 G, 242/45
[51] Int. Cl.................. C03b 37/02, B65h 54/02
[58] Field of Search........ 65/2, 11 W; 242/18 G, 45

[56] References Cited
UNITED STATES PATENTS
3,771,324  11/1973  Klink et al. ...................... 65/11 W

*Primary Examiner*—Robert L. Lindsay, Jr.
*Attorney, Agent, or Firm*—Carl G. Staelin; John W. Overman; Myron E. Click

[57] ABSTRACT

The method and apparatus of this invention are illustrated in an embodiment of apparatus for controlling the tension of linear materials between material feeding and collecting means. Means are provided for collecting linear material into a package, including means for controlling the rate of collection. Means are shown for delivering the linear material to the collecting means, including means for controlling the rate of delivery. A predetermined tension is provided on the linear material between the delivering and collecting means by yieldingly biasing the linear material away from a straight path between the delivering and collecting means. The position of the biasing means is sensed as a measure of and to adjust the relative rates of delivery and collection to maintain the desired tension on the linear material. The rate of movement of the biasing means is selectively controlled by means responsive to increasing tension on the linear material for retarding the rate of movement of the biasing means during the final portion of travel in response to increased tension, thereby substantially preventing overadjustment of the rates of delivery and collection of the linear material. Means responsive to decreasing tension inhibit the action of the retarding means to enable the biasing means to maintain contact with the linear material to prevent slack from developing and to prevent loss of control of the feeding and collection of the linear materials.

23 Claims, 17 Drawing Figures

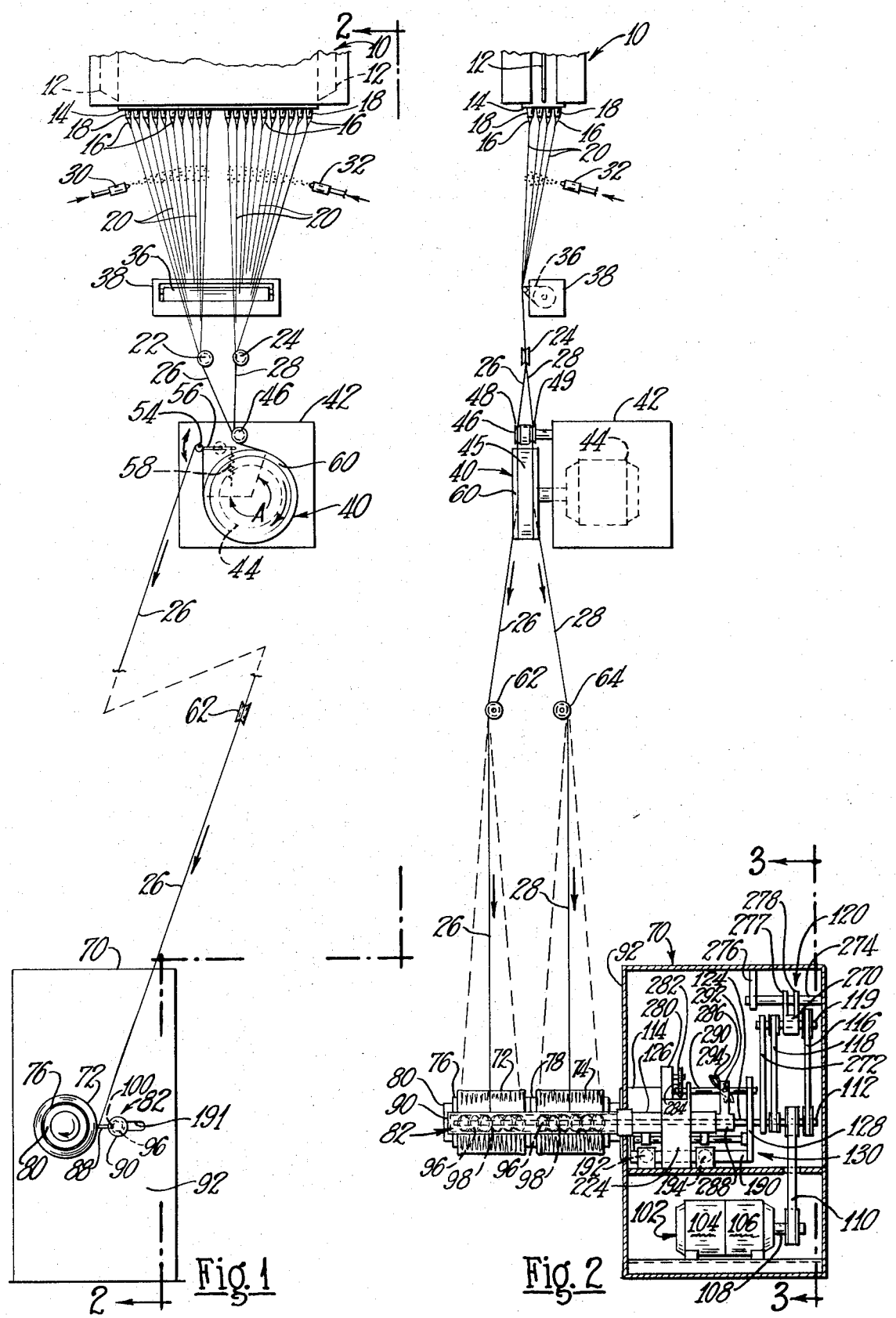

METHOD OF AND APPARATUS FOR PROCESSING LINEAR ELEMENTS

BACKGROUND OF THE INVENTION

This invention is illustrated as used in the production of continuous filaments of a thermoplastic material and more particularly in improvements for producing such filaments where production apparatus uses mechanical attenuation of filaments from streams of heated thermoplastic material. The invention is especially useful in producing continuous glass filaments and strands of these filaments.

Heated thermoplastic materials such as molten glass may be drawn into continuous filaments from streams flowing from a feeder holding a body of the heated material. In the past, the fiber forming apparatus attenuated the streams into individual continuous filaments and combined them into a bundle or strand under the influence of pulling forces exerted directly by a winder. The winder collected the strand into a wound package on a collection tube mounted on a driven rotatable collet. Such winders can collect strands at linear strand speeds of 10,000 to 15,000 feet per minute or more.

The above-described process has inherent shortcomings that may influence the formation of the filaments, strands and wound packages. For example, this type of production apparatus uses the winding package itself to provide the attenuating forces. Consequently, repeated wraps of strand on the package with high strand tension gradually builds up an increasing inward compressive force on the package. This compressive force can crush filaments and buckle interior strand layers. Tension on the strand can also "bury" the strand by squeezing strand portions of overlying layers between and below strand portions of underlying layers. The "buried" strand cannot be freely withdrawn from the package and the entangled strand may break. Further the gradual build-up of the winding package effects changes in the strand collection speed for a given rotational speed of the winding collet. The build-up of a package increases its diameter and consequently its circumference. Since circumferential surface or peripheral speed of a winding package equals package circumference times the angular speed of the package, at a given angular collet speed the strand collection speed (and filament attenuation speed) during package build-up increases towards a maximum speed at the end of a packaging cycle as the package diameter increases. Under these conditions the filaments are smaller in diameter at the end of a package cycle than they are at the beginning of the cycle. Some packages collect strand for 60 minutes or more. Therefore, filament diameter differences and thus package peripheral speed differences, can be considerable.

There have been attempts to overcome the difficulties. For example, special collets have been made to apply an outward force against the inward compressive forces of a winding package. Such collets have made package removal from collets easier but do not relieve tension within a package to a desired degree.

Improvements have also been made to overcome filament diameter non-uniformity in forming operations by varying the viscosity of the streams and by varying the collet speed during formation of a package. In large scale production applications these viscosity and collet speed variations have normally been made in a linear fashion. But, since the collection speed variations during package buildup change nonlinearly, such prior effects have not been as successful as desired for certain fiber forming operations, particularly where the fibers have very, very small diameters.

In addition, apparatus has been provided to overcome compressive forces in a package from strand tension and to produce uniform filament diameters by using pulling wheels rotated at a constant rotational speed, with the pulling wheels being disposed between a stream feeder and a collecting device. The winders in this apparatus rotate a collecting package on a collet or spindle with only sufficient force to take up the strand as strand is made available or delivered to it by the pulling wheel. Constant torque or constant horse power motors are normally used to rotate the collet. The motors used reduce rotational speed and thus the tension in the collecting strands on the package in response to the increasing package size and/or mass. This apparatus does reduce compressive forces in a wound package and provides uniform tension on filaments being pulled from the feeder to provide filament diameter uniformity. But the apparatus does not control tension in a strand.

Further, prior apparatus has lacked stability in high speed strand collection operations. The instability in operation of the apparatus tends to produce sudden linear strand speed variations that jerk strands. In processes like that just described, using apparatus which requires the matching of linear strand speeds between the pulling wheel and the collecting package on the driven collet, jerks or sudden variations in strand speed can be especially disastrous to glass filaments because they are essentially inextensible.

Apparatus has been disclosed in the copending patent application, Ser. No. 206,008, filed Dec. 8, 1971, and assigned to the same assignee as the present invention, which improves the strand formation and collection process. This apparatus supplies a control signal which causes a patterned rate of change in the angular speed of the collection package during package build up to attempt to match the collection speed of the strand to the feed speed of the strand. Means are then provided which are effective in response to sensed differences between collection and feed speeds of the strand for varying the patterned rate of change to bring the collection speed back into a matched relationship with the feed speed. While this apparatus has shown a marked improvement over the prior art, difficulties are still sometimes encountered during the matching of collection and feed speeds.

Accordingly, it is an object of this invention to provide improved method and apparatus for forming continuous filaments from heated thermoplastic filament forming material such as molten glass.

Another object of the invention is to provide improved apparatus for forming continuous filaments from heated thermoplastic filament forming material, such as molten glass, subsequently combining the filaments into a strand, and then collecting the strand into a wound package at a selected tension.

Yet another object of the invention is improved apparatus for reducing or removing the effects of jerks or sudden speed variations when matching strand collection speed with a strand feed speed during collection of a wound strand package.

Still another object of the invention is to provide an improved method and apparatus for processing linear elements.

SUMMARY OF THE INVENTION

The above objects are featured in embodiments shown herein which illustrate the use of the invention in producing and packaging glass fiber strands. A feeder or bushing supplies molten glass streams for attenuation into continuous glass filaments. The attenuated filaments are gathered into a glass strand. A rotatable pulling wheel engages the glass strand for simultaneously attenuating the glass filaments and feeding the glass strand for packaging. A rotatable collector is provided for the collection of the glass strand from the rotatable pulling wheel into a wound package. Means are provided for driving the pulling wheel and for controlling the speed or rate of delivery of the strand from the pulling wheel, and for driving the collector and controlling the speed or rate of collection of the strand.

A control signal is supplied which has a patterned rate of change that is effective to modify the rotational speed of the collector during package build-up to cause the linear strand collection speed to approach in general the linear strand feed speed. Means are provided for engaging the strand between pulling wheel and the rotatable collector for sensing the differences between the linear strand feed speed and the linear strand collection speed. Means responsive to the sensed speed differences are effective to vary the patterned rate of change of the control signal to bring the linear strand collection speed into a matched relationship with the actual linear strand feed speed.

The speed difference sensing means is also utilized to provide a predetermined tension on the linear material between the delivering and collecting means. The tensioning apparatus includes means for yieldingly biasing the linear material away from a straight path between the delivering and collecting means and means responsive to the position of the biasing means for adjusting the relative rates of delivery and collection to maintain the desired tension on the linear materials.

The rate of movement of the biasing means is selectively controlled. Means responsive to increasing tension on the linear material retards the rate of movement of the biasing means during the final portions of the travel of the biasing means in response to increased tension, thereby substantially preventing overadjustment of the rates of delivery and collection of the linear material. Means responsive to decreasing tension inhibits the action of the retarding means to enable the biasing means to maintain contact with the linear material to prevent slack from developing in the linear material.

The movement rate controlling means for the biasing means may include a damping cylinder having a piston head relatively reciprocable therein in response to movement of the biasing means, means for limiting the rate of travel of the piston head with respect to the cylinder in a first direction, and means for enabling the rate of travel of the piston head with respect to the cylinder in a second direction to be essentially non-restricted.

The damping cylinder is filled with fluid, the piston head is slidably reciprocable in the cylinder, and means are provided for controlling the flow of the fluid to and from opposing sides of the piston head. The cylinder and the piston head are connected to reciprocate with respect to each other in response to movement of the biasing means.

The fluid flow control means may include check valve means. Relative reciprocation of the piston head and the cylinder with respect to each other in response to increased tension applies fluid pressure on a check valve means to maintain it closed. Relative movement of the piston head and cylinders with respect to each other in response to decreased tension on the linear material applies fluid pressure to open the check valve means to enable essentially non-restricted movement of the piston head with respect to the cylinder. The check valve means is advantageously located within the damping cylinder to prevent the intrusion of air into the fluid which may interfere with proper operation. In the embodiment shown, the check valve is carried in the piston head.

Other objects, features and advantages will become apparent as the invention is described in detail in the following description with references being made to the accompanying drawings; in which FIG. 1 is a front elevational view of apparatus embodying the principles of the invention, showing a continuous glass filament forming operation where a filament pulling device attenuates glass filaments and a take-up winder collects glass strand as a wound package;

FIG. 2 is a side elevation view, partially in section, of the apparatus shown in FIG. 1, the section being taken along lines 2—2 in FIG. 1;

DESCRIPTION OF THE PREFERRED EMBODIMENTS

Figure 3:
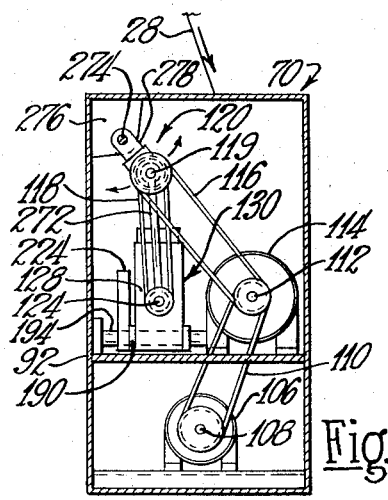
FIG. 3 is a back elevation view in section of the winder shown in FIGS. 1 and 2, the section being taken along lines 3—3 in FIG. 2.

The method and apparatus of the invention are particularly valuable in processes for forming filaments from heat softened fiber forming mineral material, such as molten glass, where temperature and filament processing speeds affect fiber diameter. Yet, method and apparatus embodying the principles of the invention are also useful in processing and packaging bundles of textile filaments made from other thermoplastic fiber forming materials. Thus, the disclosed glass fiber forming operation is only an example used to explain the operation of the invention. The invention has wider application in a variety of filament forming operations and processing operations for linear material generally.

The apparatus illustrated in FIGS. 1 and 2 shows a continuous glass filament forming operation embodying the principles of the invention. A rotary filament pulling device forms continuous glass filaments at a constant filament forming speed. The apparatus combines the filaments into two strands and collects the strands below the rotary pulling device at a selected strand tension. Normally such strand tension is less than the sum of the tension in the filaments above the rotary pulling device.

The filament pulling device is located between or intermediate a collector and a source of molten glass streams from which the glass filaments are drawn. Hence, the filament pulling device isolates or separates the glass filament forming tension in the filaments above the device from the filaments collected as strands below the device. A tensioning device introduces and automatically maintains a predetermined or selected tension, normally in the range of from 30 to 200 grams, into the glass strands between the filament pulling device and the collector.

The linear collection rate of the collector is matched with the linear delivery rate at which the rotary pulling device feeds the strands to the collector.

The embodiment shown collects two packages. However, one can use the apparatus of the invention to collect only one package or more than two packages.

FIGS. 1 and 2 illustrate a container or feeder 10 that holds a body of molten glass. The feeder 10 can receive a continuing supply of molten glass in several known ways. For example, a forehearth can supply molten glass to the feeder 10 from a furnace which has heated batch materials to molten glass. A melter associated with the feeder 10 can supply molten glass to the feeder by reducing glass marbles to a heat-softened condition. At the ends of the feeder 10 are terminals 12 that are connected to a source of electrical energy to heat the feeder 10 by conventional resistance heating. Such heating keeps the molten glass in the feeder 10 at proper fiber-forming temperatures and viscosities. The feeder 10 has a bottom wall 14 with orifices or passageways formed therein for delivering streams 16 of molten glass from the feeder 10. As shown the depending orifice projections or tubular members 18 have the glass feeding orifices formed therein which extend through the bottom 14. The feeder 10 is normally made of platinum or an alloy of platinum for glass fiber forming operations.

The molten glass streams 16 are attenuated downwardly into individual continuous glass filaments 20. Gathering shoes 22 and 24 below the feeder 10 divide and combine the continuous glass filaments 20 into two bundles or strands 26 and 28, respectively.

Water and/or a liquid sizing or other protective coating material may be applied to the filaments 20. In this embodiment nozzles 30 and 32 adjacent the bottom 14 of the feeder 10 direct water spray onto the continuous glass filaments 20 before the shoes 22 and 24 combine the filaments 20 into the glass strands 26 and 28.

A sizing applicator 36 supported within a housing 38 just above the gathering shoes 22 and 24 applies a liquid sizing or other coating material to the continuous glass filaments 20. The applicator may be any suitable type of applicator known to the art. The applicator 36 is shown as an endless belt moved through liquid held in the housing 38. As the continuous glass filaments 20 pass in touching relationship across the surface of the moving endless belt applicator 36, the filaments dip into the coating material carried on the belt surface and some of the liquid on the surface transfers to the fibers.

A pulling wheel 40 attenuates the continuous glass filaments 20 at a constant speed from the molten glass streams 16 supplied by the feeder 10. The pulling wheel 40 is rotatably mounted on a housing 42 located just below the shoes 22 and 24. A motor 44 within the housing 42 rotates the pulling wheel at a constant high angular speed. The pulling wheel 40 in this embodiment may be about 12 inches in diameter. The motor 44 rotates the wheel 40 sufficiently fast to withdraw the continuous glass filaments 20 from the streams 16 at linear speeds of up to 12,000 feet per minute and faster.

The strands 26 and 28 proceed from the shoes 22 and 24 over a strand alignment shoe 46 having circumferential grooves 48 and 49 and into contact with a smooth circumferential surface 45 of the pulling wheel 40. The shoe 46 aligns the paths of the traveling strands for spaced apart mutually parallel relationship on the smooth circumferential surface 45 of the pulling wheel 40, the strands being disposed substantially parallel to the circumferential center line of the pulling wheel 40.

From the pulling wheel 40 the strands 26 and 28 advance upwardly and proceed over the top of a spool or roller 54 rotatably mounted on the end of an arm 56. The arm 56 is pivotally mounted on the housing 42. In FIG. 1 the roller 54 and arm 56 are somewhat above and slightly to the left of the pulling wheel 40. A spring 58 within the housing 42 biases the arm 56 in a clockwise direction as viewed in FIG. 1. The biasing force of the spring 58 introduces selected tension into the traveling strands 26 and 28. The introduced tension is selected to permit the build of desired stable wound packages. The tension is maintained at a selected magnitude by a tensioning device, shown in FIGS. 6 through 8, operating in cooperation with motor controls, both to be described hereinafter.

The locations of the alignment shoe 46 and the roller 54 promote non-slipping engagement between the wet traveling strands 26 and 28 and the rotating peripheral surface 45 of the pulling wheel 40. An engagement of the strands with from 60 to 80 percent of the length of the peripheral surface 45 is normally sufficient to insure non-slipping engagement between the surface 45 and the wet strands 26, 28. Angle A in FIG. 1 represents the angular engagement of the strands 26 and 28 along the peripheral surface 45 of the wheel 40. Angle A is normally from 240° to 300°, an angle of from 250° to 280° being preferred for pulling wheels having a diameter of 11 to 12 inches.

To promote non-slipping engagement between the wet strands 26, 28 and the pulling wheel 40, an annular layer 60 of polyurethane may be formed on the smooth circumferential surface 45 of the wheel 40. At times it can be useful to control the surface finish, e.g. to somewhat roughen the circumferential surface 45, to enhance engagement between the surface and the wet strands.

The pulling wheel 40 feeds the strands 26, 28 at a constant linear strand speed to a winder 70 below. The strands travel from the pulling wheel 40 across the roller 54 and strand alignment shoes 62, 64 to the winder 70. The winder 70 collects the strands 26 and 28 as essentially identical wound packages 72 and 74 on collectors 76, 78, respectively. The collectors are shown as tubes telescoped over a spindle or collet 80. A drive within the winder 70 rotates the collet 80.

Strand traversing apparatus 82 of the winder 70 reciprocates the strands 26, 28 back and forth lengthwise of the packages 72, 74 on the collet 80 to distribute the advancing strands on their respective packages during package formation.

Figure 4:
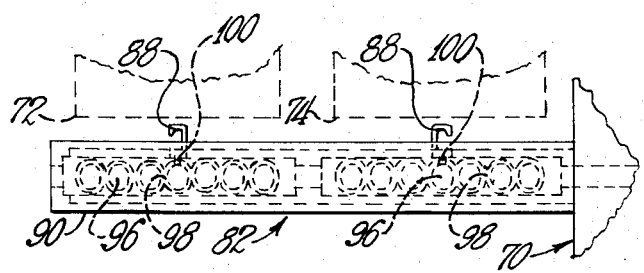
FIG. 4 is a plan view of the strand traversing portion of the winder shown in FIGS. 1 through 3, the dashed lines indicating packages being collected by the winder.

The strand traversing apparatus 82 includes strand guides 88 (best seen in FIG. 4) held in spaced relation adjacent to the packages 72 and 74 by a support arrangement. The guides 88 slide in a slot lengthwise of a horizontally extending tubular cam support housing 90 projecting from the frame 92 of the winder 70. Rotatably mounted within the support housing 90 are identical co-axially joined together cylindrical or barrel cams 96 with surface guide grooves 98. Cam followers 100 connect the strand guides 88 with the grooves 98 of the barrel cams 96. As the cams 96 rotate, the strand guides 88 reciprocate along the slot in the housing 90 lengthwise of the collet 80 and of the packages 72 and 74. The cam support housing 90 and the cams 88 extend co-axially. The housing 90 extends in a direction parallel to the collet 80 with its axis in the same horizontal plane with the axis of the collet 80. The strand guides 88 have hook shapes formed at the ends to keep the strands 26 and 28 engaged with the guides. As the cams 96 reciprocate the strand guides 88, the guides reciprocate the strands 26 and 28 lengthwise of the collecting tubes 76, 78 to form the packages 72, 74.

The winder 70 includes a drive comprising a motor-clutch arrangement 102 within the winder housing 92. The drive arrangement effects rotation of the cams 96 and rotation of the collet 80 at a controlled speed ratio. The desired package design determines the ratio.

The drive 102 includes a constant speed electric motor 104 that drives the rotor of an associated eddy-current clutch 106. The clutch 106 has an output shaft 108. Magnetic forces within the clutch 106 transfer torque from the rotor driven by the motor 104 to the output shaft 108.

In operation the speed of the motor 104 remains constant, however, changes in flux density within the clutch 106 vary the amount of the motor's constant speed rotational energy output transferred to the output shaft 108 to provide a variable speed drive. The greater the flux density the larger the percentage of motor output transferred to the output shaft 108.

The drive 102 rotates the collet 80 through a non-slipping belt 110, such as a timing belt, connecting the output shaft 108 with a collet drive shaft 112 above the drive 102. The drive shaft 112 rotates the collet 80. The shaft 112 is co-axial with the collet 80 and is rotatably supported by a bearing assembly 114.

Rotational energy from the collet drive shaft 112 moves the strand traversing apparatus 82 through non-slipping belts 116 and 118, which may again be timing belts. The belt 116 connects the collet drive shaft 112 and a rotatably mounted idler shaft 119 of an idler assembly 120. The belt 118 connects the idler shaft 119 with a cam drive shaft 124 that connects to and rotates the cams 96. The drive shaft 124 is co-axial with the cams 96 and is rotatably mounted in a bearing support assembly 126 and the vertical end plate 128 of a movable carriage 130.

As the packages 72 and 74 build on the rotating collet 80, the diameter of each of the packages increases. As the package diameter increases, the speed of the circumferential or axial surface of each of the packages 72 and 74 also increases. Hence, the strand collection speed would increase with increasing package diameter if there were no offsetting reduction in the angular speed of the collet 80. Accordingly, the angular speed of the collet 80 is controlled to offset increases in strand collection speed from increasing package size during strand collection, to maintain a strand collection linear speed equal to the constant strand supply or delivery linear speed from the rotating pulling wheel 40.

The collet speed controls include means for establishing a control signal effective to modify the rotational speed of the collet 80 in accordance with a patterned rate of change that, in general, will provide a package surface strand receiving speed matched to the speed of strand feed. The controls further include means for sensing differences between the linear rate of supply and the linear rate of collection and means effective in response to sensed speed differences to modify the patterned rate of change of the control signal to bring the rate of strand collection into conformity with the actual linear rate of strand supply from the pulling wheel 40 throughout build-up of the packages 72 and 74. The result is a substantially constant linear strand collection speed throughout on the surfaces of the packages 72 and 74 during the build-up in package diameter, when the motor 44 rotates the wheel 40 at a constant speed.

As will be shown in a second embodiment hereinafter, the apparatus disclosed herein includes means for linearly feeding linear material and means for receiving the fed material where at least one of the means (either the feeding means or the receiving means) is variable in its delivery or collection speed during advancement of the material and the other means has its delivery or collection speed matched thereto. To effect the matching in FIGS. 1 through 4 the apparatus includes control means supplying a control signal having a patterned rate of change that is effective to modify the speed of the matching speed means to approach in general the speed of the variable speed means. Means for sensing the differences between the speeds of the feeding means and receiving means, and means effective in response to the sensed speed differences bring the matching speed means into conformity with the actual speed of the variable speed means.

Figure 5:
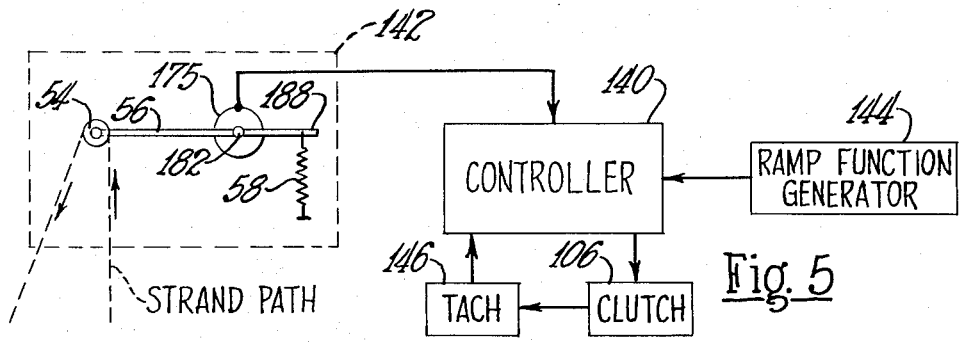
FIG. 5 is a block diagram of controls useful with the apparatus shown in FIGS. 1 and 2.

FIG. 5 shows a block diagram of controls useful in this invention. A controller 140 supplies varying voltage signals to the eddy-current clutch 106 to control the rotational speed of the collet 80 during collection of the packages 72 and 74. The controller 140 receives signals both from a sensing transducer 142 and from a pattern generator such as the ramp function generator 144. The changing output voltage of the controller 140 in response to the input from the ramp function generator 144 controls the magnetic field strength of the eddy-current clutch 106 to decrease the angular speed of the collet 80 to maintain the strand collection speed matched with the strand supply speed as the packages 72 and 74 increase in diameter. For improved stability, the controller 140 may receive feedback voltage signals from a tachometer 146, the tachometer signals being a measurement of the actual angular speed of the clutch output shaft 108 and hence of the speed of collet 80.

Controllers of the type indicated at 140, the ramp function (or false signal) generator 144, and the cooperation of the two to produce the results described herein are known in the art. For example, such combinations are shown in the U.S. Pat. No. 3,126,268, issued Mar. 24, 1964.

Figure 6:
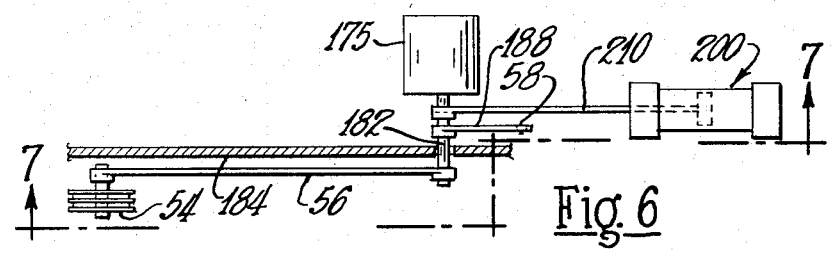
FIG. 6 is a somewhat enlarged plan view of the strand engaging transducer or sensor and tensioning device shown in FIGS. 1, 2 and 5.
Figure 7:
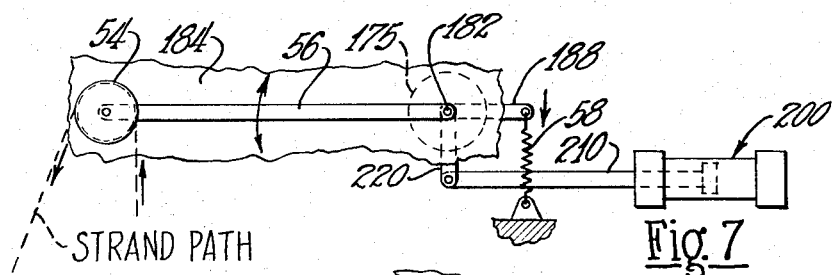
FIG. 7 is a front elevation view of the apparatus shown in FIG. 6 taken along the lines 7—7 of FIG. 6.

The transducer 142, represented in block form in FIG. 5, includes a potentiometer 175, the pivotally mounted arm 56 and the spool or roller 54 carried on one end of arm 56. The transducer 142 can be more fully understood by considering FIGS. 6 and 7 together with FIG. 5. As shown in FIGS. 6 and 7 the potentiometer 175 is supported within the housing 42 and has a control shaft 182. The shaft 182 extends through the wall 184 of the housing 42 and has the arm 56 fixedly mounted thereon. Hence, any pivotal movement of the arm 56 moves the shaft 182 about its axis and accordingly modifies the output resistance of the potentiometer 175. Since the resistance of the potentiometer 175 is connected in the circuits of the controller 140, a signal controlled by the potentiometer is provided and varied when the resistance of the potentiometer is varied.

The yieldingly biasing force of the spring 58 urges the arm 56 to pivot about the shaft 182 in a clockwise direction into contact and engagement with the strands 26 and 28 turning over the roller or wheel 54. A lever arm 188 is fixed at one end to the potentiometer control shaft 182 and extends from the shaft 182 in a direction opposite to the arm 56. The spring 58 connected to the lever arm 188 produces a torque in the control shaft 182 urging the arm 56 into the strands 26 and 28. The arm 56, spring 58, shoe 54 and potentiometer 175 constitute a sensor that engages the strands 26 and 28 to sense the relationship between the strand collection and feed speeds.

The transducer 142 has a predetermined position for the arm 56 where the resistance of the potentiometer 175 contributes neither an additive signal (indicating a need for a speed increase) nor a subtractive signal (indicating a need for a speed decrease) to the action of the controller 140. In practice a horizontal position for the arm 56 has provided a satisfactory "no signal" position for the transducer 142. Other "no signal" positions can be used.

If the end of arm 56 is moved progressively downwardly from the horizontal, the potentiometer 175 is connected in controller 140 to provide a subtractive signal to reduce the speed of the collet 80, since the strand is being wound on a package faster than it is being delivered or supplied by the pull wheel 40.

When the end of arm 56 moves above the horizontal position, the potentiometer is connected in controller 140 to provide an additive signal to increase the speed of the collet 80, since the strand is being supplied or delivered at a rate in excess of the collection rate.

In operation the transducer 142 senses the relationship between the strand feed or delivery rate of the pulling wheel 40 and the strand collection rate of the winder 70 and provides a signal in response to the sensed differences between the rate of feed and the rate of collection of the material. When the strand collection speed is greater than the strand supply speed, the length of the strands 26 and 28 between pulling wheel 40 and the packages 72 and 74 shortens. Hence, the strands 26 and 28 pull the spool end of the arm 54 downwardly. On the other hand, when the strand collection rate or speed is less than the strand supply or delivery speed or rate, the length of the strands 26 and 28 between the pull wheel 40 and the packages 72 and 74 increases. Hence, the strands 26 and 28, in a sense, develop slack that permits the biasing force of the spring 58 to move the arm 56 upwardly.

The above-described arrangement has worked relatively satisfactorily in matching strand delivery and collection rates. However, additional problems have been discovered. The spool 54 and arm 56 necessarily have a certain mass. When the spool-arm 54, 56 is moved rapidly or "jerked" downwardly by increasing strand tension between the pulling wheel and the packages being formed, the mass of the arrangement 54, 56 and the velocity given thereto imparts a momentum to the arrangement 54, 56 that may cause it to overshoot the position which would provide the proper corrective signal. Thus, the modifying signal supplied by the potentiometer 175 may be too much and overcorrection or overadjustment may occur.

Further, the momentum imparted to the sensing arrangement 54, 56 may be sufficient to cause a loss of contact or engagement between the spool 54 and the strands 26, 28, thereby resulting in a "zero" tension condition in the strands between the pull wheel 40 and the collecting packages 72, 74. The "zero" tension condition may result in the strands licking further around the pull wheel 40, parts of the strand "roll wrapping" on the packages, and/or the strands jumping out of the strand guides 62, 64 or the traverse guides 88. Obviously, these are all undesirable and should be controlled.

In addition, the undesirable effects described above will interfere with the efforts to maintain a desired, predetermined tension on the strands between the pull wheel 40 and the packages 72, 74 so that packages may be formed without the deleterious packaging effects known in the art which result from too much or too little tension.

To overcome this problem a damping mechanism indicated generally at 200 in FIGS. 6 and 7 has been provided. An arm 210 of the mechanism 200 is pivotally connected to one end of an arm 220 which has the other end thereof fixedly connected to the shaft 182 of the potentiometer 175. The arm 210 is thus responsive to and dampens the movement of the yieldingly biased means (spool 54, arm 56, spring 58) which is sensing the difference between delivery and collection rates of the strand. The yieldingly biased means 54, 56, 58 also senses the tension in the strand since the spring force necessary to maintain the arm 56 in the "no signal" position for the potentiometer 175 is an indication that the proper tension is being applied to strands 26, 28.

If the damping mechanism 200 is an ordinary dashpot in which equal resistance is afforded against movement of a piston rod 210 in either direction, the undesirable conditions discussed hereinbefore will be reduced to a lesser degree and sometimes overcome. However, difficulty is encountered in designing a dashpot for some systems in which the linear strand speed is very great, in that when sufficient resistance is afforded in the dashpot to prevent overshoot when the spool 54 is pulled down, then the dashpot may offer too much resistance in the opposite direction to enable the spool 54 to follow the strand and maintain engagement therewith when a decreased tension situation suddenly occurs and the spool 54 is urged upwardly by the biasing effect of the spring 58. However, a simple dashpot may suffice for the damping mechanism 200, if the system is such that the resistances forward and reverse for the arm 210 are such that no adverse effects will occur whether the arm 56 and spool 54 are moving upwardly or downwardly.

Figure 8:
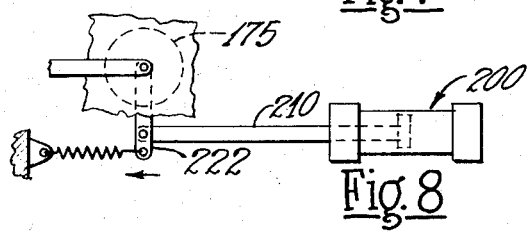
FIG. 8 is a partial view of an alternative embodiment of the sensor and tensioning apparatus of this invention.
Figure 9:
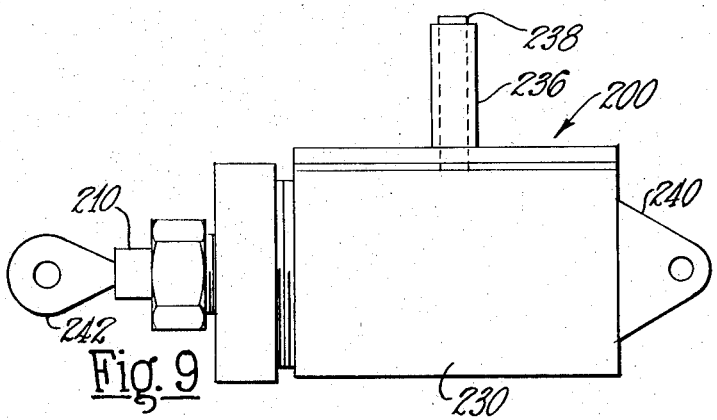
FIGS. 9, 10 and 11 are side, plan and end elevational views of the novel sensor movement damping apparatus.
Figure 10:
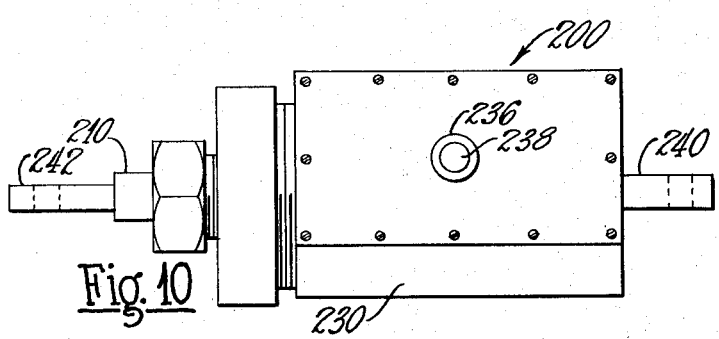

Referring to FIG. 8 there is illustrated an alternative embodiment in which the arm 210 of the dashpot or damping mechanism 200 is connected to an arm 222 depending downwardly and fixed to the shaft 182 of the potentiometer 175. In this instance the spring 58 is also connected to the arm 222 and provides a biasing for the spool and arm 56. FIG. 8 is exemplary of a number of different arm, bell-crank, or other mechanical configurations that may be utilized to enable both the spring 58 and the damping mechanism 200 to be responsive to and control the actions of the spool 54, arm 56, and potentiometer 175.

Referring now to FIGS. 9 through 14 there is illustrated a novel damping mechanism 200 which will provide improved operation of this invention over a standard dashpot or damping mechanism, and which can be adjusted to perform correctly in almost all applications.

The damping mechanism illustrated in detail in FIGS. 9 through 12 comprises a cylinder body 230 having a cylindrical bore 232 and a fluid reservoir 234 formed therein, the bore and reservoir being connected by a conduit 266. The cylindrical bore 232 is to be completely filled with a fluid, preferably a hydraulic fluid having an oil type base. The reservoir 234 is provided so that when the arm 210 enters the cylindrical bore 232 and additional volume is added to the bore 232, and the fluid may be displaced through conduit 266 to the reservoir 234.

An air release and access conduit 236 is provided on top of the reservoir 234 which may be used to reduce air pressure differentials in the reservoir. A felt wicking 238 is provided in the conduit 236 to prevent dirt or other foreign matter from entering the reservoir. The entrance of air to that part of the reservoir which would enable the air to get inside the cylindrical bore 232 via the conduit 266 and interfere with the operation of the damping mechanism is prevented since the air in the fluid will always collect at the top of the reservoir 234 adjacent the access conduit 236. The conduit 236 will serve as a fill conduit to place the hydraulic fluid in the damping mechanism.

A connector 240 is formed at one end of the body 230 for pivotally attaching the body 230 to the housing 42. A connector 242 is provided on the arm 210 for pivotally connecting the piston arm 210 to the arm 200 shown in FIGS. 6 and 7.

A piston head 250 is responsive to movement of the arm 210 and is slidably reciprocable within the cylindrical bore 232. A check valve arrangement generally indicated at 252 is provided in the piston head and includes a port 254 and a bore 256 formed in the piston rod, a ball 258 seated on the opening of the bore 256, a spring 260 which biases the ball 258 to a closed position over the opening of the bore 256, and a port 262 formed in the piston head.

Figure 12:
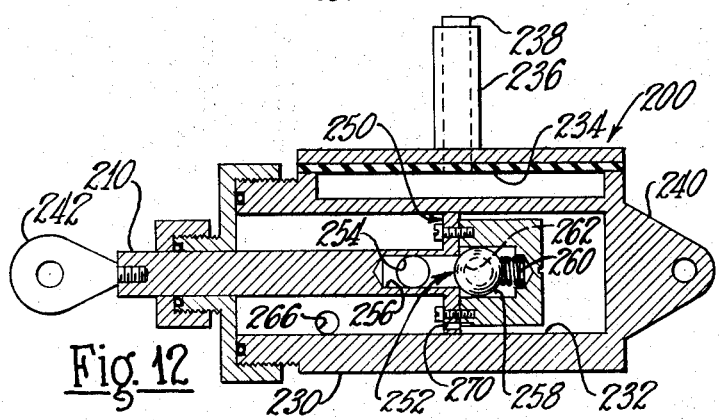
FIG. 12 is a sectional view of the apparatus illustrated in FIGS. 9, 10 and 11, taken along lines 12—12 of FIG. 11.
Figure 11:
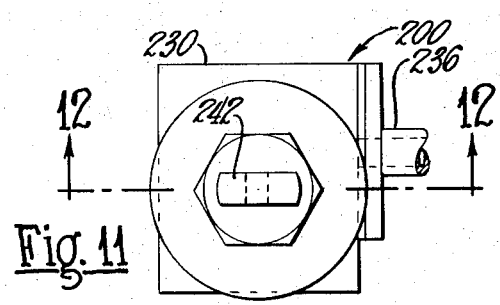

When the piston head is moving from right to left, in FIG. 12, the pressure by the fluid on the ball 258 releases or pushes back the ball 258 to permit fluid to flow from one side of the piston head through port 254, bore 256, and port 262 to the opposite side of the piston head. This action is illustrated schematically in FIG. 14. Therefore piston travel to the left is essentially non-restricted because the fluid force removes the ball from the valve seat permitting fluid flow through the major ports 254, 262.

When the piston head is moving to the right, however, the force of the fluid on the ball 258 maintains it in a sealing position seated in the opening of the bore 256, thus preventing fluid flow through the major ports 262, 254. To enable controlled movement of the piston head to the right, one or more bleed holes or ports 270 are formed in the piston head, sized to provide the damping action desired. That is, the size of the bleed hole means 270 will determine how fast the piston head 250 may move from left to right. This action of the damping mechanism 200 is illustrated schematically in FIG. 13.

Referring again to FIGS. 6 and 7, it may be seen that if the damping mechanism 200 shown in FIGS. 9 through 12 is utilized the piston head will be in a floating relationship when the arm 56 is in a stable position, such as in the "no signal" or horizontal position, with the minor movements transmitted thereto by minor variations in strand tension being accommodated by movement of the fluid back and forth through the bleed holes or ports 270. However, when a substantial displacement downwardly occurs and after an initial movement in which fluid flow through the bleed port means 270 accommodates the minor variation, pressure begins to build on the right hand side of the piston head. The movement of the piston head from left to right, and thus the movement of the arm 56 downwardly, is retarded or dampened by an amount or to the extent determined by the size of the bleed hole orifice means 270. Thus, the arm 56 can move downwardly to start transmitting a signal via the rheostat or potentiometer 175 and may continue to move downwardly until a compensating or corrected position is reached. However, when the corrected position is reached, there is essentially no overshoot because of the damping provided by the mechanism just described.

Conversely, if there is a sudden decrease in strand tension the arm 56 may move upwardly relatively rapidly to maintain the spool 54 in sensing contact and engagement with the strands 26, 28 to maintain control of the strand tension and the speed differentials between the pull wheel 40 and the packages 72, 74. This occurs, because the check valve is forced open by the movement to the left of the arm 210.

We have thus described apparatus for processing linear material which includes means for feeding linear material and controlling the linear rate of feed of the linear material, and means for collecting the linear material into a wound package and for controlling the linear rate of collection of the the material. Means are provided for sensing differences between the linear rate of feed and the linear rate of collection of the material which includes an element yieldingly biased into contact with the material between the feeding and the collecting means. Control means are provided which are effective in response to sensed differences in the rates of feed and collection for modifying at least one of the rates of feed and collection of the feeding and collecting means to maintain the linear rates of feeding and collecting substantially the same.

The movement of the yieldingly biased sensing element is selectively controlled by means responsive to increased pressure of the linear material against the sensing element for retarding movement of the sensing element to prevent overadjustment of relative feed and collection rates by the modifying means, and means responsive to decreased pressure of the linear material against the sensing element for inhibiting action of the retarding means to enable the sensing elements to remain biased in sensing contact with the linear material. Thus, the retarding action of the check valve arrangement is dependent upon which direction the arm 56 and spool 54 is moving.

Figure 16:
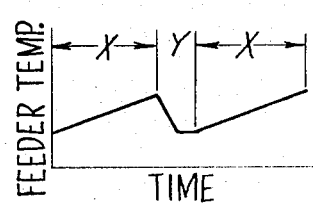
FIGS. 16 and 17 are graphical representations illustrating the operation of the apparatus shown in FIG. 15.
Figure 17:
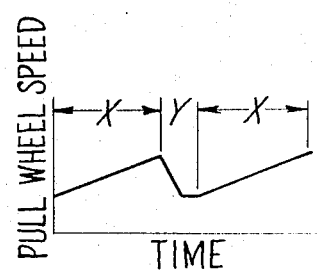
Figure 13:
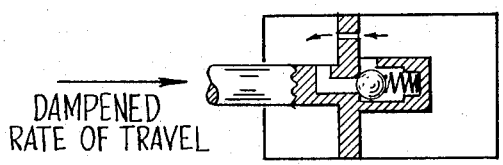
FIGS. 13 and 14 are schematic views of the apparatus of FIGS. 9 through 12, illustrating the operation thereof.
Figure 14:
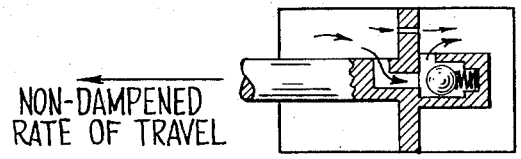
Figure 15:
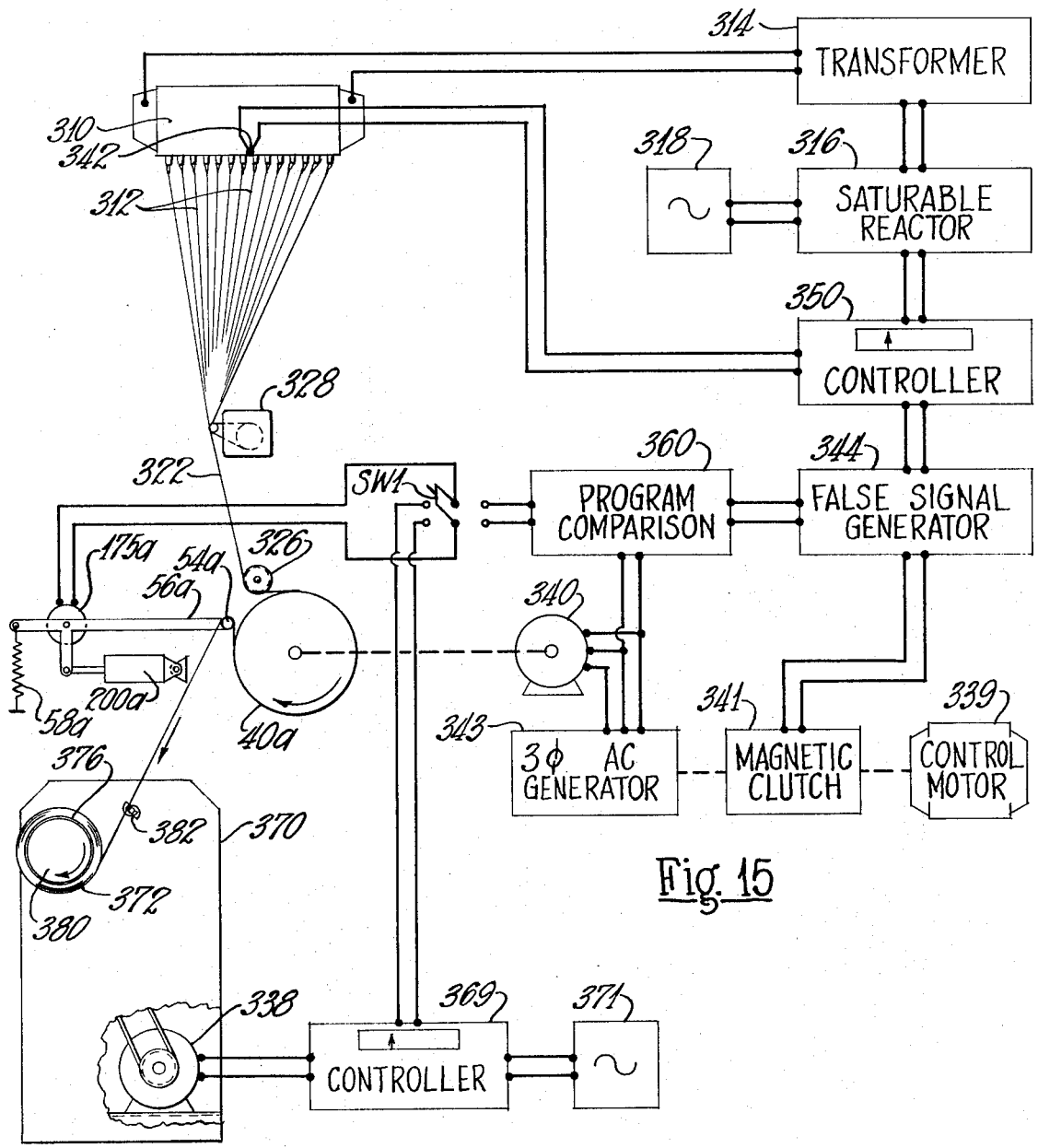
FIG. 15 is a front elevational view of an alternative embodiment of the teachings of this invention.

Referring now to FIGS. 15 through 17 there is shown an alternate embodiment of the teachings of this invention. A textile bushing or feeder 310 contains molten glass for forming textile fibers or filaments 312. The molten glass may be maintained at a preset operating temperature when a packaging cycle begins and then cooled to increase the viscosity and thus offset the increase in attenuating speeds, in a manner to be described hereinafter. The operating temperature is maintained within the desired range by direct passage through the feeder 310 of electrical current supplied from a transformer 314 which is controlled by a saturable core reactor 316, or other suitable electrical current control apparatus such as silicon control rectifiers, connected to a power supply 318.

The textile fibers 312 are formed of the molten glass fed through orifices in the bottom of the feeder 310. The fibers 312 are gathered together into a strand 322 by passage of the fibers over a gathering member 326 in a manner well known in the art. The fibers are supplied with sizing or lubricant or other coating material by an applicator 328. The strand 322 then passes from the gathering member 326 around the pulling wheel 40a over a guide and sensing member 54a, through a traverse mechanism 382, and onto a package 372 formed on a tube 376 mounted on a rotating collet 380 of a winder 370. The collet is rotated by a motor 338.

The sensing spool 54a is mounted on the end of an arm 56a which is yieldingly biased against the strand 322 by a spring 58a. The arm 56a pivots the shaft of a potentiometer 175a. A damping mechanism 200a is responsive to movement of the arm 56a. The mechanism just described operates in the same manner as the mechanism described hereinbefore in FIGS. 5 through 14 to provide a signal from the potentiometer 175a which is indicative of the differences in the rate of strand delivery from the pull wheel 40a and the rate of strand collection on the package 372, and which is also indicative of the amount of or variations in tension being applied to the strand 322 between the pull wheel 40a and the package 372.

The control system for the apparatus in FIG. 15 includes an electrical circuit having at least one heat sensor or thermocouple 342 connected through control units for maintaining the temperature of the feeder 310 at desired values. The thermocouple 342, which may be illustrative of a plurality of thermocouples, senses the temperature of the feeder 310. The signal from the thermocouple 342 may be amplified in and is received by a controller 350 which is preset to hold the temperature of the molten glass at a desired setpoint. The output from the controller 350 is supplied to the saturable reactor 316 to control the current applied by the transformer 314 to the feeder 310.

A false signal generator 344, of the type described and having the action disclosed in the hereinbefore referenced U.S. Pat. No. 3,126,268, supplies a false signal to the controller to cause the feeder temperature to vary cyclically as indicated in FIG. 16. The false signal generator 344 may include a ramp function generator which provides a signal to the controller 350 to cause the feeder temperature to vary cyclically as shown in FIG. 16. That is, during the time X when a package is being formed, the feeder temperature is increased to increase the viscosity. During the time Y when the previously formed package is being removed and a new tube is being placed on the collet, the feeder temperature is returned to the original starting point so that it may be increased during the next packaging cycle X.

In this embodiment it is desired to have the speed of the pulling wheel 40a increased during a packaging cycle so that the diameter of the filaments 312 being formed will be maintained uniform as the feeder temperature is increased. The drive motor 340 for wheel 40a, for purposes of this embodiment may be a frequency responsive, variable feed motor. Motor speed control means includes a control motor 339 driving a three phase A.C. generator 343 via a magnetic clutch 341, with the false signal or ramp function generator 344 providing an output which controls the magnetic clutch connection between the control motor 339 and the three phase generator 343. The magnetic clutch 341 is advantageously adjustable in slip in response to preselected program signals from the false signal or ramp function generator output thereto. The false signal or ramp function generator 344 provides program signals to the magnetic clutch 341 to effect ramp function control of the pull wheel drive motor 340. As can be seen in FIG. 17 the pull wheel speed is increased during packaging cycle X, decreased to its original starting point while the package is being removed and a new collecting tube is being mounted on the collet, and then increased along the ramp function during the next packaging cycle X.

To insure that the pull wheel driving motor 340 is being driven at the desired speeds, there is provided a program comparison means 360 which samples the frequency generated by the three phase generator 343. The program comparison unit 360 compares the frequency signal sampled with the program frequency to check the accuracy of the ramp function being generated by the false signal generator 344. If the actual speed, according to the frequency sample, is in error from that required or desired, the program comparison unit 360 generates a correction signal to modify the signal provided by the false signal generator 344 to provide the desired speed via the magnetic clutch 341.

The collet 380 is driven by the winder motor 338. Since the speed of the pull wheel 40a increases throughout the packaging cycle, the variables of the system illustrated in FIG. 15 may be correlated so that the collet 380 may be driven at a constant speed. The rate of collection of the strand 322 on the packaging tube 376 may then increase during a packaging cycle as the diameter of the package increases and may be sufficient to match the increase in strand supply or delivery rate as provided by the increasing speed of the pull wheel 40a. Thus in one instance, the winder motor 338 may be a constant speed motor.

If the system variables are not correlated, then it may be necessary to also vary the speed of the motor 338 in order to maintain a strand collection rate which is matched to the strand delivery rate from the pull wheel 40a. Further, even though a constant speed motor is being utilized, it is desirable to be able to match the strand delivery rate and the strand collection rate by utilizing the signal from the potentiometer 175a as disclosed hereinbefore. Therefore, a controller 369 is provided which connects a power source 371 to the winder motor 338. If a constant speed for the motor 338 is desired then the controller 369 may be placed at a setpoint to hold the constant speed and the output of the controller 369 modified in accordance with signals received from the potentiometer 175a, as the speed of the collection rate differs from the speed of the delivery rate.

As an alternative, the controller 369 may be supplied with a false signal which may be a ramp function similar to that supplied by the false signal generator 344, to cause the speed of the collet 380 to increase or decrease as necessary throughout the cycle to match the delivery speed of the strand from the pull wheel 40a. Again, such an output from the controller 369 may be modified by a signal from the potentiometer 175a via the switch SW1 which is closed to connect the controller 369 to the potentiometer 175a.

If, in some circumstances it is desirable to maintain the collet 380 driven at a constant speed, the potentiometer 175a is then available as an additional input to the program comparison unit 360 to further control the speed of the pull wheel 40a. The switch SW1 is then closed to connect the potentiometer 175a to the program comparison unit 360 to vary or modify the speed of the pull wheel 40a.

The embodiment illustrated in FIGS. 15, 16, and 17 thus illustrates that the tension controlling and speed controlling devide as illustrated in FIGS. 6 through 14 may also be utilized to control speed and tension differences when a first delivery rate is variable while the collector is driven at a constant speed, when the first delivery rate is variable and when the second collection rate is variable, and, as illustrated hereinbefore, when the delivery rate is constant and the collection rate is variable.

It is to be noted that although the specific embodiments described herein have shown spring means for yieldingly biasing the sensor element 54 against the linear material, other means performing the same function may be used to carry out the teachings of this invention. For example, magnetic fields may be used to bias the sensor against the linear material. Further, the force of gravity may be used to maintain the sensor in contact with the linear material. If the linear material is proceeding in a vertical direction any well known system of linkages, pivots and varying weights may be used to urge the sensor into contact. If the linear material is proceeding in a direction other than vertical then the weight of the sensor alone might be adjusted to pivot against and maintain contact with the linear material.

It should also be noted that although the means for retarding the movement of the sensor element 54 has been shown as a novel hydraulic element, having particular advantages in the production of glass fiber strands, that other means performing the same function may be utilized to carry out the teachings of this invention.

For example, a dashpot or piston-cylinder combination might be used wherein there was no communication between opposing sides of the piston head. The damping fluid in this instance could then be a compressible fluid, such as air, which would offer a smaller resistance for initial movement of the piston head and increasing resistance for further movement in the same direction as the fluid becomes more compressed. Reaction of a compressible fluid damper may further be controlled by the selection of the fluid and the pressures of the fluid in the cylinder.

Further, mechanisms with non-linear reactions such as non-linear compound springs or the like may also be used.

While there have been shown and described and pointed out the fundamental novel features of the invention with references to the preferred embodiments thereof, those skilled in the art will recognize that various changes, substitutions, omissions and modifications in the methods and structures described may be made by those skilled in the art without departing from the spirit of the invention.

We claim:

1. Apparatus for controlling the tension of linear material between material feeding and collecting means, comprising
   a. means for collecting linear material into a package;
   b. means for delivering the linear material to said collecting means;
   c. means for adjusting at least one of the rates of collection and delivery relative to the other of the rates;
   d. means for providing a predetermined tension on said linear material between said delivering and collecting means including means for yieldingly biasing said linear material away from a straight path between the delivering and collecting means, and means responsive to the position of said biasing means for adjusting the relative rates of delivery and collection to maintain the desired tension on said linear material; and
   e. means for selectively controlling the rate of movement of said biasing means including means responsive to increasing tension for retarding the rate of movement of said biasing means during the final portion of travel in response to increased tension thereby substantially preventing overadjustment of the relative rates of delivery and collection of the linear material and means responsive to decreasing tension for inhibiting the action of said retarding means to enable said biasing means to maintain contact with said linear material to prevent slack from developing in said linear material.

2. Apparatus as defined in claim 1 in which said movement rate controlling means includes a damping cylinder filled with fluid, a piston head slidably reciprocable in said cylinder, and means for controlling the flow of said fluid to and from opposing sides of said piston head, said cylinder and piston head being connected to reciprocate with respect to each other in response to movement of said biasing means.

3. Apparatus as defined in claim 2 in which said fluid flow control means includes check valve means, relative reciprocation of said piston head and cylinder with respect to each other in response to increased tension applying fluid pressure on said check valve means to maintain it closed, relative movement of said piston head and cylinder with respect to each other in response to decreased tension applying fluid pressure to open said check valve means.

4. Apparatus as defined in claim 1 in which said movement rate controlling means includes a damping cylinder having a piston head relatively reciprocable therein in response to movement of said biasing means, means for limiting the rate of travel of said piston head with respect to said cylinder in a first direction, and means for enabling the rate of travel of said piston head with respect to said cylinder in a second direction to be essentially non-restricted.

5. Apparatus for processing linear material, comprising
   a. means for feeding linear material;
   b. means for collecting the fed linear material onto a wound package;
   c. means for sensing differences between the linear rate of feed and the linear rate of collection of said material including an element yieldingly biased into contact with said material between said feeding and collecting means;
   d. means effective in response to sensed differences in the rates of feed and collection for modifying at least one of the rates of feed and collection of said feeding and collecting means to maintain the linear rates of feeding and collecting substantially the same; and
   e. means for selectively controlling the movement of said biased sensing element including means responsive to increased pressure of said linear material against said sensing element for retarding movement of said sensing element to prevent overadjustment of relative feed and collection rates by said modifying means, and means responsive to decreased pressure of said linear material against said sensing element for inhibiting action of said retarding means to enable said sensing element to remain biased in sensing contact with said linear material.

6. Apparatus for producing linear material, comprising
   a. means for continuously forming flexible linear material from a body of heat-softened material;
   b. means for collecting the continuous linear material into a package;
   c. means for receiving the continuously formed linear material and feeding the material to said collecting means;
   d. means located intermediate said collecting and feeding means including a movable sensor element for sensing differences between the rates of collection and feeding;
   e. means responsive to said movable element for adjusting at least one of the rates of collection and feeding of said collecting and feeding means; and
   f. means for controlling the rate of movement of said movable sensor element including means for selectively retarding movement of said sensor element to prevent overadjustment of the relative rates of collection and feeding of the linear material.

7. Apparatus as defined in claim 6 in which said collecting and feeding means each include rotary means and means for driving each rotary means.

8. Apparatus as defined in claim 7 in which said rotary feeding means is driven at a constant speed.

9. Apparatus as defined in claim 7 in which said rotary collecting means is driven at a constant speed.

10. Apparatus as defined in claim 7 in which said rotary collecting and feeding means are each driven at a constant speed.

11. Apparatus as defined in claim 7 in which said rotary collecting and feeding means are each driven at a variable speed.

12. Apparatus for producing glass fibers, comprising
   a. means for supplying molten glass streams for attenuation into continuous glass filaments;
   b. rotary means for simultaneously attenuating the glass filaments and feeding the filaments for collection;
   c. rotary means for collecting the filaments into a wound package;
   d. means located intermediate said feeding and collecting means including movable sensor means in contact with said filaments for sensing differences between the rate of feeding and the rate of collection;
   e. means responsive to said movable sensor means for adjusting at least one of the rates of feeding and collecting of said feeding and collecting rotary means to maintain the rates substantially the same; and
   f. means for controlling the rate of movement of said movable sensor element including means for selectively retarding movement of said sensor element to prevent overreaction to a change in rates between feeding and collection.

13. Apparatus as defined in claim 12 in which said sensor movement control means includes cylinder means having a piston head slidably reciprocable therein and fluid therein for affecting movement of the piston head with respect to the cylinder.

14. Apparatus as defined in claim 13 which further includes check valve means connecting opposing faces of said piston head, said check valve closing in response to fluid pressure on one face and opening in response to fluid pressure on the other face.

15. Apparatus as defined in claim 14 which further includes fixed orifice means connecting opposing faces of said piston head, the orifice in said orifice means being sized to control the rate of movement of said piston head with respect to said cylinder when said check valve means is closed.

16. A method for processing linear material comprising the steps of
   a. feeding linear material;
   b. collecting the fed linear material as fed and winding the linear material into a package;

c. sensing differences in the rates of feeding and collecting by maintaining a sensor in contact with the material between the feeder and collector;

d. adjusting at least one of the rates of feeding and collecting in response to movement of said sensor to maintain the rates of feeding and collecting substantially the same; and e. controlling the rate of movement of said sensor in response to sensed differences to prevent overcorrection of the relative rates of feeding and collection of the linear material.

17. A method as defined in claim 16 in which said sensing step includes yieldingly biasing said sensor against said linear material to provide a predetermined tension in the linear material.

18. A method as defined in claim 17 in which said sensor movement controlling step includes retarding movement of said sensor in response to increased pressure against said sensor by said linear material.

19. A method as defined in claim 18 in which said sensor movement controlling step further includes permitting essentially non-restricted movement of said sensor in response to decreased pressure against said sensor by said linear material.

20. A method of processing glass fiber strand including the steps of a. feeding glass fiber strand to a rotating collector for collection into a wound package;

b. sensing differences between rates of feed and collection and providing a predetermined tension in said strand by yieldingly biasing sensor means against said strand between feeding and collection stations;

c. adjusting the relative rates of feeding and collection of said strand in response to sensed differences to maintain the rates of feed and collection substantially the same; and d. selectively retarding movement of said sensor means to maintain sensing contact with said strand and to maintain tension in said strand.

21. Apparatus for controlling the movement of linear material comprising a. means for collecting linear material;

b. means for delivering the linear material to said collecting means;

c. means for adjusting at least one of the rates of collection and delivery relative to the other of the rates;

d. means for providing a given length of said linear material between said delivering and collecting means including means for yieldingly biasing said linear material away from a straight path between the delivering and collecting means, and means responsive to the position of said biasing means for adjusting the relative rates of delivery and collection to maintain a matched relation therebetween; and e. means for selectively controlling the rate of movement of said biasing means including means responsive to decreasing length of material between said delivery and collecting means for retarding the rate of movement of said biasing means during the final portion of travel in response to an increasing length of said material thereby minimizing tendencies of overadjustment of the relative rates of delivery and collection of the linear material and means responsive to increasing length of said linear material between said delivering and collecting means for inhibiting the action of said retarding means to enable said biasing means to move in contacting relationship with said linear material.

22. Apparatus for controlling the movement of linear material comprising a. means for collecting linear material;

b. means for delivering the linear material to said collecting means;

c. means for adjusting at least one of the rates of collection and delivery relative to the other of the rates;

d. means for providing a given tension on and length of said linear material between said delivering and collecting means including means for yieldingly biasing said linear material away from a straight path between the delivering and collecting means, and means responsive to the position of said biasing means for adjusting the relative rates of delivery and collection to maintain a matched relationship therebetween; and e. means for selectively controlling the rate of movement of said biasing means including means responsive to increasing tension for retarding the rate of movement of said biasing means in only one direction to minimize tendencies for overmovement in such direction and consequent overadjustment of the relative rates of delivery and collection of the linear material.

23. Apparatus for controlling the tension of linear material between material feeding and collecting means, comprising a. means for collecting linear material into a package;

b. means for delivering the linear material to said collecting means;

c. means for adjusting at least one of the rates of collection and delivery relative to the other of the rates;

d. means for providing a predetermined tension on said linear material between said delivering and collecting means including means for yieldingly biasing said linear material away from a straight path between the delivering and collecting means, and means responsive to the position of said biasing means for adjusting the relative rates of delivery and collection to maintain the desired tension on said linear material; and e. means for selectively controlling the rate of movement of said biasing means including means responsive to decreasing tension for inhibiting the action of said retarding means to enable said biasing means to maintain contact with said linear material to prevent slack from developing in said linear material.

* * * * *